United States Patent
Gariepy et al.

(10) Patent No.: US 10,845,822 B2
(45) Date of Patent: Nov. 24, 2020

(54) SYSTEMS AND METHODS FOR UTILIZING FLEETS OF ROBOTS

(71) Applicant: Clearpath Robotics Inc., Kitchener (CA)

(72) Inventors: Ryan Christopher Gariepy, Kitchener (CA); Alex Bencz, Kitchener (CA)

(73) Assignee: Clearpath Robotics Inc., Kitchener (CA)

( * ) Notice: Subject to any disclaimer, the term of this patent is extended or adjusted under 35 U.S.C. 154(b) by 82 days.

(21) Appl. No.: 16/173,615

(22) Filed: Oct. 29, 2018

(65) Prior Publication Data

US 2020/0133305 A1   Apr. 30, 2020

Related U.S. Application Data

(63) Continuation of application No. 15/429,974, filed on Feb. 10, 2017, now Pat. No. 10,120,390, which is a
(Continued)

(51) Int. Cl.
*G05D 1/02* (2020.01)
*G08G 1/00* (2006.01)
(Continued)

(52) U.S. Cl.
CPC ............ *G05D 1/0291* (2013.01); *B60L 58/12* (2019.02); *G05D 1/0088* (2013.01); *G08G 1/202* (2013.01); *B60L 2200/40* (2013.01)

(58) Field of Classification Search
CPC ... B60L 2200/40; B60L 58/12; G05D 1/0088; G05D 1/0291; G08G 1/202
See application file for complete search history.

(56) References Cited

U.S. PATENT DOCUMENTS

| 5,199,524 A | 4/1993 | Ivancic |
| 6,668,318 B1 | 12/2003 | Jenkins et al. |

(Continued)

FOREIGN PATENT DOCUMENTS

WO   2017072771 A1   5/2017

OTHER PUBLICATIONS

Eric Park, Linda Kobayashi and Susan Lee: "Extensible Hardware Architecture for Mobile Robots" Intelligent Robotics Group Apr. 18, 2005.

*Primary Examiner* — Babar Sarwar
(74) *Attorney, Agent, or Firm* — Bereskin & Parr LLP/S.E.N.C.R.L.,s.r.l.

(57) ABSTRACT

Systems and methods for utilizing fleets of robots are disclosed. The method comprises receiving a task with a computing device, and retrieving, from a memory, battery-charge attributes associated, respectively, with at least three robots. A determination is made that the first battery-charge attribute is greater than the second battery-charge attribute, which is greater than the third battery-charge attribute. The battery-charge attributes are evaluated against a criterion. After determining that the first and second battery-charge attributes satisfy the criterion, the first and second robots are added to a selection set. After determining that the third battery-charge attribute does not satisfy the criterion, the third robot is omitted from the selection set. The selection is then optimized based on the first and second battery-charge attributes, and then one of the first and second robots is selected from the selection set to perform an action associated with the task request.

17 Claims, 12 Drawing Sheets

Related U.S. Application Data continuation of application No. 14/927,930, filed on Oct. 30, 2015, now Pat. No. 9,606,544.

(60) Provisional application No. 62/073,355, filed on Oct. 31, 2014.

(51) Int. Cl.
  *G05D 1/00* (2006.01)
  *B60L 58/12* (2019.01)

(56) References Cited

U.S. PATENT DOCUMENTS

| | | |
|---|---|---|
| 7,409,356 B1 | 8/2008 | Geddes |
| 7,826,919 B2 | 11/2010 | D'Andrea et al. |
| 7,894,932 B2 | 2/2011 | Mountz et al. |
| 7,894,933 B2 | 2/2011 | Mountz et al. |
| 7,912,574 B2 | 3/2011 | Wurman et al. |
| 8,220,710 B2 | 7/2012 | Hoffman et al. |
| 8,502,498 B2 * | 8/2013 | Fecher ............... B60L 53/63 320/109 |
| 8,914,182 B2 * | 12/2014 | Casado ............... G05D 1/0088 701/24 |
| 9,606,544 B2 * | 3/2017 | Gariepy ............... G05D 1/0297 |
| 9,766,671 B2 * | 9/2017 | Dorn .................... G08G 1/20 |
| 2004/0158355 A1 | 8/2004 | Holmqvist et al. |
| 2007/0129847 A1 | 6/2007 | Ulmer et al. |
| 2008/0009965 A1 | 1/2008 | Bruemmer et al. |
| 2008/0009966 A1 | 1/2008 | Bruemmer et al. |
| 2008/0028237 A1 | 1/2008 | Knight |
| 2008/0262669 A1 | 10/2008 | Smid et al. |
| 2008/0291879 A1 | 11/2008 | Duff et al. |
| 2009/0074545 A1 | 3/2009 | Lert, Jr. et al. |
| 2009/0077808 A1 | 3/2009 | Malm |
| 2009/0160255 A1 | 6/2009 | Grady |
| 2009/0304101 A1 * | 12/2009 | LoPorto ............... H04L 27/2626 375/260 |
| 2010/0060604 A1 | 3/2010 | Zwart et al. |
| 2011/0031929 A1 * | 2/2011 | Asada ................. B60L 53/14 320/109 |
| 2011/0144823 A1 * | 6/2011 | Muller ................. B60L 53/305 700/297 |
| 2012/0019205 A1 * | 1/2012 | Kressner ............... B60W 20/10 320/109 |
| 2012/0101627 A1 | 4/2012 | Lert |
| 2012/0179337 A1 | 7/2012 | Doan |
| 2013/0000438 A1 | 1/2013 | Ouellet |
| 2013/0006677 A1 * | 1/2013 | Anglin ................. H02J 7/0027 705/5 |
| 2013/0035823 A1 * | 2/2013 | Yoshida ................ G06Q 50/30 701/31.5 |
| 2013/0179057 A1 | 7/2013 | Fisher et al. |
| 2013/0248547 A1 | 9/2013 | Braun et al. |
| 2014/0244097 A1 | 8/2014 | Colwell |
| 2014/0303768 A1 | 10/2014 | Klumpp et al. |
| 2014/0303814 A1 | 10/2014 | Burema et al. |
| 2014/0308098 A1 | 10/2014 | Lert et al. |
| 2014/0344118 A1 | 11/2014 | Parpia et al. |
| 2014/0350725 A1 | 11/2014 | LaFary et al. |
| 2014/0360832 A1 | 12/2014 | Aldrich |
| 2014/0365258 A1 | 12/2014 | Vestal et al. |
| 2015/0006005 A1 | 1/2015 | Yu et al. |
| 2015/0091507 A1 * | 4/2015 | Hyde ..................... B60L 53/37 320/108 |
| 2015/0100504 A1 * | 4/2015 | Binion ............... G06Q 30/0278 705/306 |
| 2015/0148951 A1 * | 5/2015 | Jeon ..................... G05D 1/0274 700/248 |
| 2015/0224891 A1 * | 8/2015 | Petrosian ............. B60L 53/665 701/31.4 |
| 2015/0339928 A1 | 11/2015 | Ramanujam |
| 2015/0360865 A1 | 12/2015 | Massey |
| 2016/0063435 A1 | 3/2016 | Shah et al. |
| 2016/0121487 A1 | 5/2016 | Mohan et al. |
| 2016/0236867 A1 * | 8/2016 | Brazeau ................ B65G 1/1378 |
| 2016/0342915 A1 | 11/2016 | Humphrey |
| 2017/0092131 A1 * | 3/2017 | Fairfield ............... B60W 30/00 |
| 2017/0123421 A1 | 5/2017 | Kentley et al. |
| 2017/0205833 A1 | 7/2017 | Gariepy et al. |
| 2017/0300054 A1 | 10/2017 | Hanson et al. |
| 2018/0143649 A1 | 5/2018 | Miao et al. |
| 2018/0247207 A1 | 8/2018 | Ristovski et al. |
| 2019/0012198 A1 | 1/2019 | Ni et al. |
| 2020/0167722 A1 * | 5/2020 | Goldberg ............... G08G 5/003 |

* cited by examiner

SYSTEMS AND METHODS FOR UTILIZING FLEETS OF ROBOTS

CROSS-REFERENCE TO RELATED APPLICATION

This application is a continuation of U.S. patent application Ser. No. 15/429,974, filed on 10 Feb. 20175, which is a continuation of U.S. patent application Ser. No. 14/927,930, filed on 30 Oct. 30, 2015, which claims priority from U.S. Provisional Patent Application No. 62/073,355, filed Oct. 31, 2014, the entire contents of which are incorporated herein by reference. The entire contents of the above-referenced documents are incorporated herein by reference.

FIELD

The specification relates generally to control of unmanned vehicles, and specifically to a system, computing device and method for controlling a fleet of unmanned vehicles.

BACKGROUND

Unmanned vehicles (also often referred to as robots) can be deployed in a wide variety of applications including, for example, manufacturing or materials handling facilities. In such facilities, a range of tasks may be required, including lifting and transporting materials having widely differing weights and dimensions, travelling various distances under various environmental conditions, and the like. Performing such varying tasks with unmanned vehicles requires that the unmanned vehicles possess sufficient capabilities, if not within each vehicle then within a set of vehicles, to perform all the required tasks.

Ensuring that unmanned vehicles deployed in such facilities poses certain challenges. For example, providing a set of unmanned vehicles that are all capable of performing all of the required tasks may be inefficient, as certain capabilities may rarely be called on (e.g. for less frequently performed tasks). On the other hand, employing vehicles with different capabilities imposes a burden on operators at the facility to assign the correct vehicle to each task when the task is performed.

SUMMARY

According to an aspect of the specification, there is a system of at least three robots comprising a first robot, a second robot, and a third robot, and a computing device in communication with the robots. The first robot has a first battery-charge level; the second robot has a second battery-charge level; and the third robot has a third battery-charge level. The computing device stores, in a memory, a battery-charge attribute respective of each of the robots, comprising a first battery-charge attribute associated with the first battery-charge level, a second battery-charge attribute associated with the second battery-charge level, and a third battery-charge attribute associated with the third battery-charge level. The computing device is configured to receive a task request. Responsive to receiving the task request, the computing device retrieves the battery-charge attributes from the memory, and evaluates the battery-charge attributes against a criterion. Upon determining that the first and second battery-charge attributes satisfy the criterion, the first and second robots are added to a selection set. Upon determining that the third battery-charge attribute does not satisfy the criterion, the third robot is omitted from the selection set. The computing device determines an optimization of the selection set based on the first and second battery-charge attributes, and then selects one of the robots from the selection set based on the optimization. Subsequently, the computing device transmits a command to the selected robot to perform an action associated with the task request.

BRIEF DESCRIPTIONS OF THE DRAWINGS

Embodiments are described with reference to the following figures, in which.

DETAILED DESCRIPTION OF THE EMBODIMENTS

Figure 1:
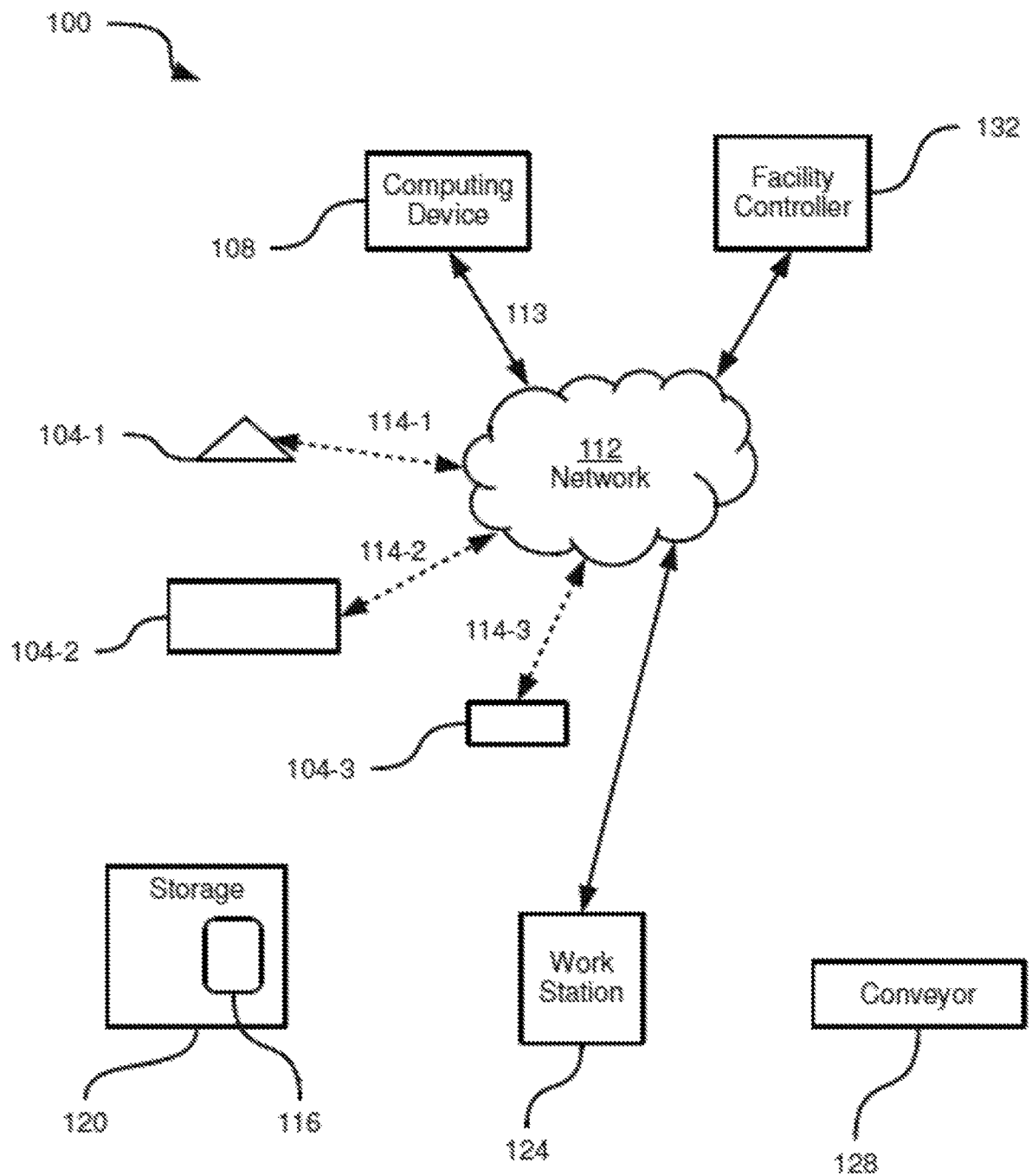
FIG. 1 depicts a system for unmanned vehicle fleet control, according to a non-limiting embodiment.

FIG. 1 depicts a system 100 including a plurality of unmanned vehicles 104-1, 104-2 and 104-3 (collectively referred to as unmanned vehicles 104, and generically referred to as an unmanned vehicle 104—similar nomenclature is used for other reference numerals herein) for deployment in a facility, such as a manufacturing facility, warehouse or the like. The facility can be any one of, or any suitable combination of, a single building, a combination of buildings, an outdoor area, and the like. A greater or smaller number of unmanned vehicles 104 may be included in system 100 than the three shown in FIG. 1. Unmanned vehicles 104 can have a wide variety of operational characteristics, as will be discussed in greater detail below.

System 100 also includes a computing device 108 for connection to unmanned vehicles 104 via a network 112. Computing device 108 can be connected to network 112 via, for example, a wired link 113, although wired link 113 can be any suitable combination of wired and wireless links in other embodiments. Unmanned vehicles 104 can be connected to network 112 via respective wireless links 114-1, 114-2 and 114-3. Links 114 can be any suitable combination of wired and wireless links in other examples, although generally wireless links are preferable to permit movement of unmanned vehicles 104 about the facility. Network 112 can be any suitable one of, or any suitable combination of, wired and wireless networks, including local area networks (LAN or WLAN), wide area networks (WAN) such as the Internet, and mobile networks (e.g. GSM, LTE and the like).

Computing device 108, as will be discussed in greater detail below, controls unmanned vehicles 104, and more specifically instructs unmanned vehicles 104 to carry out tasks within the facility. The nature of the tasks performed by unmanned vehicles 104 under the control of computing device 108 is not particularly limited. In general, the tasks assigned to unmanned vehicles 104 require unmanned vehicles 104 to perform various actions respective to various items at various locations within the facility. Data defining the actions, items and locations are provided to unmanned vehicles 104 by computing device 108. In some examples, as will be discussed below, tasks assigned to unmanned vehicles can omit data defining one or more of the above-mentioned elements.

The actions, items and locations mentioned above are not particularly limited. Actions performed by the unmanned vehicles 104 can include any of a variety of physical interactions with items. For example, actions can include picking up an item, dropping an item off, and any number of in-process actions performed after picking an item up and before dropping the item off (e.g. machining or cleaning an item at a specified location with the assistance of other equipment), and the like. A wide variety of items and locations are also contemplated. Items generally include any physical object or combination of physical objects. Thus, an item as discussed herein can be a box or other container (whether empty or containing material), a machine part, a tool, a collection of material such as sand or gravel, and the like. Locations include any regions within the facility bounded by coordinates. Such regions can be three-dimensional (i.e. volumes), two-dimensional (i.e. areas), one-dimensional (i.e. lines) or zero-dimensional (i.e. points).

In the present example, an item 116 is illustrated at a first location 120. Item 116 can be, for example, a box or other container and location 120 can be an area defined on a floor of the facility for storage of items. A second location 124 is also illustrated. Second location 124 can contain, for example, a work station where materials are to be removed from or placed in item 116, or where item 116 is to be labelled or otherwise modified. A wide variety of other work station activities will occur to those skilled in the art (e.g. welding stations, paint spray booths, and so on). A third location 128 is also illustrated in FIG. 1. In the present example, third location 128 contains a conveyor apparatus, which may carry item 116 to another part of the facility.

In light of the examples of items and locations given above, examples of tasks to be performed by unmanned vehicles will occur to those skilled in the art. For example, a task may include picking up item 116 at location 120. Another task may include holding item 116 at location 124. Yet another task may include dropping off item 116 at location 128.

As will be seen below, unmanned vehicles 104 have various operational capabilities, referred to herein as "attributes". In addition to dynamic attributes that change over time, such as the location of a vehicle 104 within the facility, the remaining charge or fuel load of a vehicle 104, and the like, vehicles 104 have static attributes. Examples of static attributes include the maximum payload of a vehicle 104, which tools or equipment the vehicle 104 possesses, and the like. Thus, different ones of vehicles 104 may be suited to different tasks. Indeed, some vehicles 104 may not be capable of completing some tasks (e.g. because they do not have the necessary equipment on board). Therefore, computing device 108 is configured not only to maintain records of the dynamic and static attributes of each vehicle 104, but also to automatically select a vehicle 104 from the set of vehicles 104 in the facility to perform each incoming task based on the task and the attributes of vehicles 104. Incoming task requests received at computing device 108 therefore need not specify which vehicle 104 must perform the task.

System 100 can also include a facility controller 132 connected to network 112, in the form of a further computing device (e.g. a server). Controller 132 can, for example, control facility equipment other than unmanned vehicles 104, such as the work station at location 124, the conveyor at location 128, and the like. Controller 132 can also, in some embodiments, administer a warehouse management system (WMS) for the facility. Controller 132 can also issue requests to computing device 108 for tasks to be performed by unmanned vehicles 104. As mentioned above, however, such task requests need not specifically identify any of unmanned vehicles 104. Indeed, controller 132 need not be aware of the existence or capabilities of any of unmanned vehicles 104.

Before describing the above-mentioned attributes and vehicle selection in greater detail, an example vehicle 104 and certain internal components of computing device 108 will be described.

Figure 2:
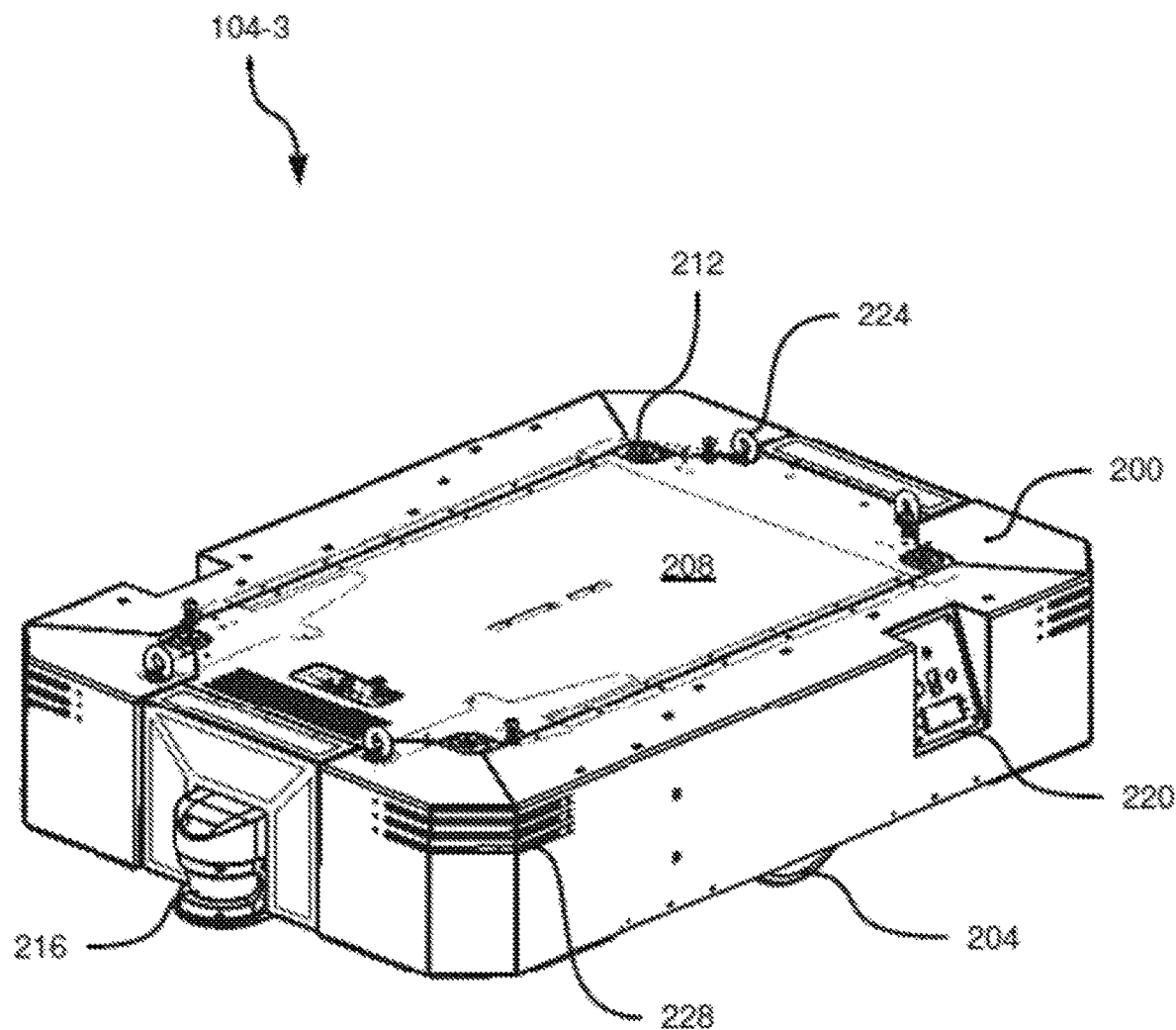
FIG. 2 depicts an example unmanned vehicle in the system of FIG. 1, according to a non-limiting embodiment.

Referring now to FIG. 2, an example unmanned vehicle is shown. In particular, unmanned vehicle 104-3 is depicted according to a non-limiting embodiment. Unmanned vehicle 104-3 is depicted as a terrestrial vehicle, although it is contemplated that unmanned vehicles 104 can also include aerial vehicles and watercraft. Unmanned vehicle 104-3 includes a chassis 200 containing or otherwise supporting various other components, including one or more locomotive devices 204. Devices 204 in the present example are wheels, although in other embodiments any suitable locomotive device, or combination thereof, may be employed (e.g. tracks, propellers, and the like).

Locomotive devices 204 are powered by one or more motors (not shown) contained within chassis 200. The motors of unmanned vehicle 104-3 can be electric motors, internal combustion engines, or any other suitable motor or combination of motors. In general, the motors drive the locomotive devices 204 by drawing power from an energy storage device (not shown) supported on or within chassis 200. The nature of the energy storage device can vary based on the nature of the motors. For example, the energy storage can include batteries, combustible fuel tanks, or any suitable combination thereof.

Unmanned vehicle 104-3 also includes a load-bearing surface 208 (also referred to as a payload surface), for carrying an item such as item 116 thereon. In some examples, payload surface 208 can be replaced or supplemented with other payload-bearing equipment, such as a cradle, a manipulator arm, or the like.

Unmanned vehicle 104-3 can also include a variety of sensors. In the present example, such sensors include at least one load cell 212 coupled to payload surface 208, for measuring a force exerted on payload surface 208 (e.g. by an item being carried by unmanned vehicle 104-3). The sensors of unmanned vehicle 104-3 can also include machine vision sensors 216, such as any suitable one of, or any suitable combination of, barcode scanners, laser-based sensing devices (e.g. a LIDAR sensor), cameras and the like. Unmanned vehicle 104-3 can also include a location sensor (not shown) such as a GPS sensor, for detecting the location of unmanned vehicle 104-3 with respect to a frame of reference. The frame of reference is not particularly limited, and may be, for example, a global frame of reference (e.g.

GPS coordinates), or a facility-specific frame of reference. Other sensors that can be provided with unmanned vehicle 104-3 include accelerometers, fuel-level or battery-level sensors, and the like.

Unmanned vehicle 104-3 can also include a control panel 220, as well as anchors 224 for securing items or other equipment to chassis 200, or for lifting chassis 200 (e.g. for maintenance). Unmanned vehicle 104-3 can also include any of a variety of other features, such as indicator lights 228.

In addition, unmanned vehicle 104-3 includes a central processing unit (CPU), also referred to as a processor, interconnected with a non-transitory memory and a network interface. Via the network interface, link 114-3 and network 112, the processor can send and receive data to and from computing device 108. For example, unmanned vehicle 104-3 can send updated location data to computing device 108, and receive task assignments from computing device 108.

Upon receipt of a task from computing device 108, unmanned vehicle 104-3 is configured to perform the task, for example by moving to a location specified in the task and performing an action specified in the task once that location is reached. Unmanned vehicle 104-3 can be configured to send status messages to computing device 108 during the performance of the task.

As mentioned earlier, unmanned vehicles 104 may be a heterogeneous set of vehicles. For example, in the embodiment illustrated in FIG. 1, unmanned vehicle 104-2 may be a larger version of unmanned vehicle 104-3 having a higher carrying capacity, while unmanned vehicle 104-1 may carry specialized equipment (e.g. a grasping device such as a manipulator arm) instead of a payload surface 208.

Figure 3:
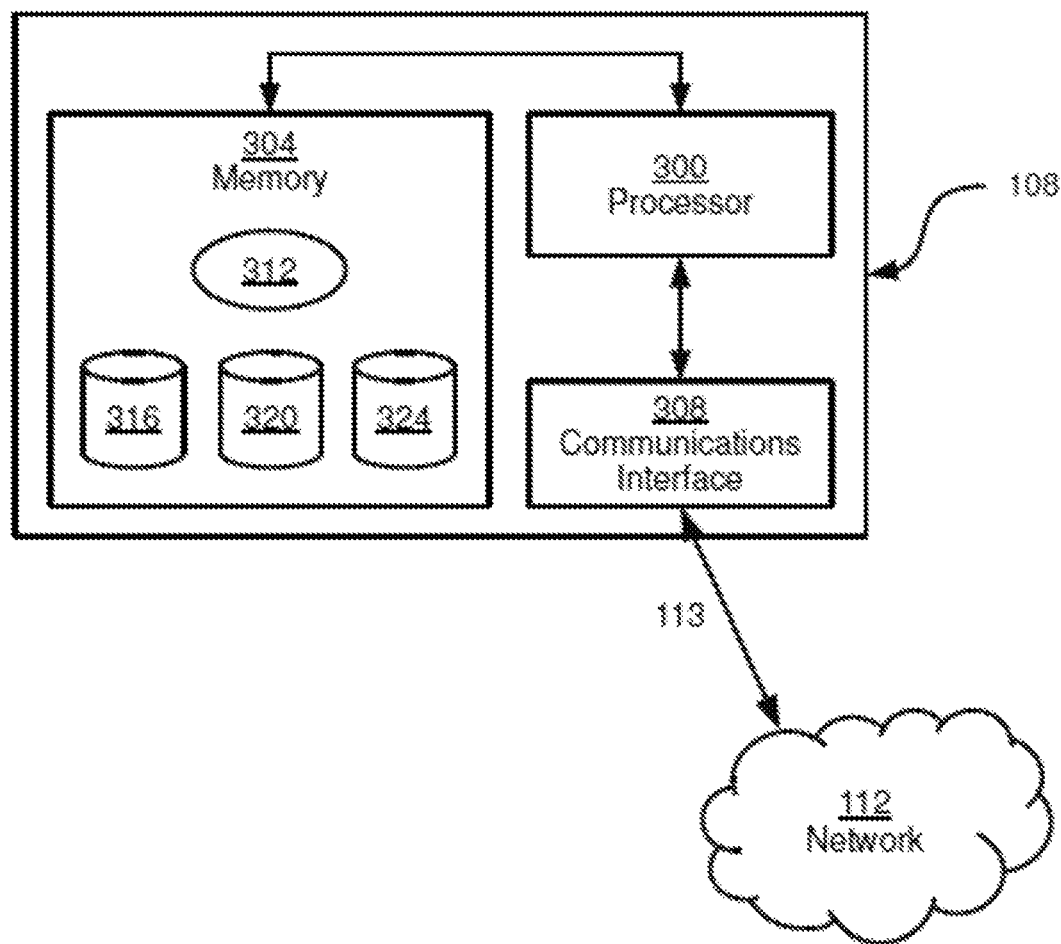
FIG. 3 depicts internal components of the computing device of FIG. 1, according to a non-limiting embodiment.

Turning now to FIG. 3, certain internal components of computing device 108 are illustrated. Computing device 108 can be any one of, or any combination of, a variety of computing devices. Such devices include desktop computers, servers, mobile computers such as laptops and tablet computers, and the like. Computing device 108 therefore includes at least one central processing unit (CPU), also referred to herein as a processor, 300. Processor 300 is interconnected with a non-transitory computer-readable medium such as a memory 304. Processor 300 is also interconnected with a communications interface 308.

Processor 300 and memory 304 are generally comprised of one or more integrated circuits (ICs), and can have a variety of structures, as will now occur to those skilled in the art (for example, more than one CPU can be provided). Memory 304 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory.

Communications interface 308 allows computing device 108 to connect with other computing devices (e.g. unmanned vehicles 104, controller 132) via network 112. Communications interface 308 therefore includes any necessary hardware (e.g. network interface controllers (NICs), radio units, and the like) to communicate with network 112 over link 113. Computing device 108 can also include input and output devices, such as keyboards, mice, displays, and the like (not shown).

Memory 304 stores a plurality of computer-readable programming instructions, executable by processor 300, in the form of various applications. As will be understood by those skilled in the art, processor 300 can execute the instructions of one or more such applications in order to perform various actions defined within the instructions. In the description below processor 300, and more generally computing device 108, are said to be "configured to" perform certain functions. It will be understood that they are so configured via the execution of the instructions of the applications stored in memory 304.

Among the applications stored in memory 304 is a fleet control application 312, also referred to herein as application 312. Application 312 is executable by processor 300 to perform various actions described herein. Memory 304, in the present example, also stores data for retrieval, processing and updating during the execution of application 312. In particular, memory 304 stores a vehicle database 316, an item database 320, and a location database 324. The three databases mentioned above can be combined, or subdivided into a different number of databases in other embodiments—the depiction of databases 316, 320 and 324 as separate databases is provided for illustrative purposes only.

In general, databases 316, 320 and 324 contain data employed by processor 300 in the selection of an appropriate one of unmanned vehicles 104 to perform a requested task. Databases 316, 320 and 324 thus contain at least one dynamic attribute and at least one static attribute respective to each unmanned vehicle 104. In addition, databases 316, 320 and 324 can contain location attributes for locations within the facility, as well as item attributes for items within the facility. Further, databases 316, 320 and 324 can contain data describing tasks currently being performed by unmanned vehicles 104. Examples of databases 316, 320 and 324 will be provided below in connection with a description of the fleet control functions performed by computing device 108.

Figure 4:
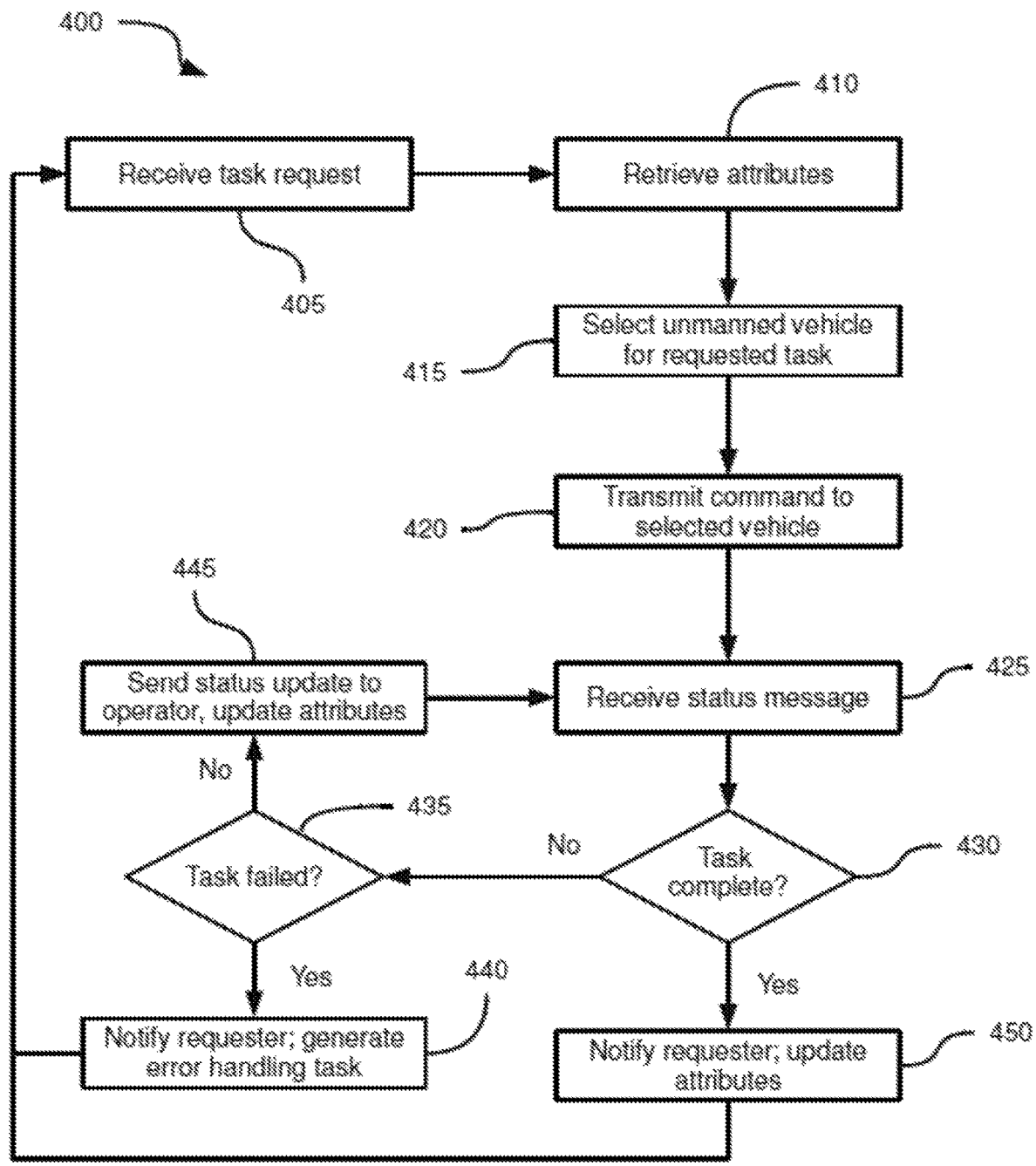
FIG. 4 depicts a method of controlling the unmanned vehicles of FIG. 1, according to a non-limiting embodiment.

As mentioned above, computing device 108 is configured to receive task requests, and to assign those task requests to unmanned vehicles 104 based on the nature of the tasks and the operational capabilities of unmanned vehicles 104 as defined by the attributes stored in memory 304. Referring now to FIG. 4, a method 400 of unmanned vehicle fleet control will be described in conjunction with its performance in system 100. In particular, the blocks of method 400 are performed by computing device 108, via the execution of application 312 by processor 300, and via the use of the contents of databases 316, 320 and 324.

At block 405, computing device 108 is configured to receive a task request. The task request received at computing device 108 includes an item identifier of an item within the facility, an action type identifier defining an action to be performed by one of the unmanned vehicles 104 (as noted earlier, the request need not specify which unmanned vehicle 104 is to perform the action) respective to that item, and a location identifier identifying the location within the facility at which to perform the action. It is contemplated that under some circumstances, task requests may be received that do not include one or more of the above parameters. Those circumstances and the resulting task requests will be discussed later.

Figure 5:
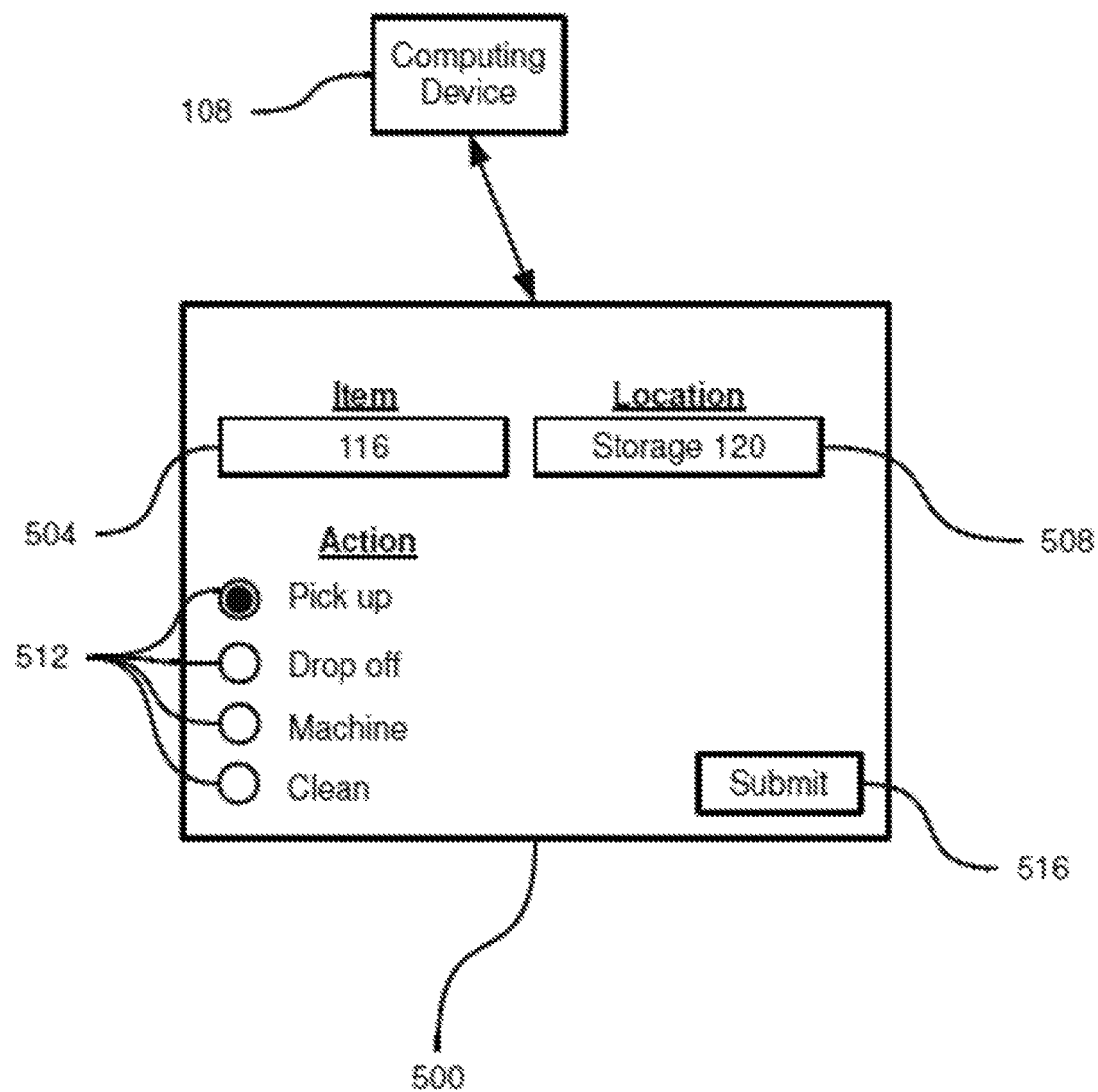
FIG. 5 depicts an example display generated in the performance of the method of FIG. 4, according to a non-limiting embodiment.

The task request can be received at processor 300 through a variety of mechanisms. In some examples, the task request can be received at processor 300 in the form of input data from input devices such as a keyboard and mouse connected to computing device 108, either directly or through another computing device (not shown). Referring to FIG. 5, a display 500 is shown connected to computing device 108 and presenting, under the control of processor 300, an interface for receiving input data defining a task request.

The interface shown on display 500 includes an item identifier field 504, a location identifier field 508, and a plurality of selectable action elements 512 each identifying a different action. Fields 504 and 508 can be text-entry fields, drop-down fields, or the like. In addition, elements 512 need not be radio buttons as illustrated in FIG. 5. In other embodiments, elements 512 can be replaced by a dropdown or text field. Fields 504 and 508 can be filled in via receipt of input data at computing device 108, and one of elements 512 can be selected via receipt of such input data. The task request represented by the data in fields 504 and 508 and the selected element 512 can be submitted to computing device 108 as a task request, for example via selection of a submission element 516. Elements 512 can represent any of a wide variety of actions, and in general include an "input" action such as "pick up" to accept an item into the fleet of unmanned vehicles 104, an "output" action such as "drop off" to discard an item from the fleet, and any number of "in process" actions to be performed respective to items that have been picked up and not yet dropped off. The "machine" and "clean" elements shown in FIG. 5 are examples of such in process actions.

In other examples, the task request received at block 405 can be received at computing device 108 via communications interface 308. For example, the task request can be received at processor 300 from communications interface 308, having arrived at communications interface 308 via link 113 and network 112 from controller 132. Controller 132 can be configured to generate task requests automatically, in response to various events. For example, controller 132 may be configured to receive data indicating that item 116 has been received at location 120, and in response to generate a task request and send the task request to computing device 108.

Task requests generated by controller 132 for transmission to computing device 108 may be generated and sent via an application programming interface (API) established by computing device 108. Indeed, in some embodiments, the same API may be used to receive task requests from controller 132 as is used by computing device to generate the interface shown in FIG. 5.

However the task request is received at block 405, upon receipt of the task request, computing device 108 is configured to proceed to block 410 of method 400. It will be assumed, in the present example performance of method 400, that at block 405 computing device 108 receives a task request containing the item identifier "116", the action type "pick up" and the location identifier "storage 120".

At block 410, in response to receiving a task request, computing device 108 is configured to retrieve attributes from memory 304. In particular, processor 300 is configured to retrieve at least a dynamic attribute and a static attribute for each unmanned vehicle 104. In the present example performance of method 400, the static and dynamic attributes are retrieved from vehicle capabilities database 316. An example of database 316 is shown below in Table 1.

TABLE 1

| Vehicle Capabilities Database 316 | | | | | | |
|---|---|---|---|---|---|---|
| Vehicle ID | Location (X, Y) | Charge | Available ? | Max Payload | Payload ID | Equipment ID |
| 104-1 | 130, 50 | 80% | Yes | 20 kg | | Manipulator Arm |
| 104-2 | 100, 0 | 70% | Yes | 400 kg | | Payload Surface |
| 104-3 | 24, 205 | 40% | Yes | 60 kg | | Payload Surface |

As seen in Table 1, database 316 includes a record for each unmanned vehicle 104. Each record contains a plurality of attributes, including both dynamic attributes and static attributes. The dynamic attributes of an unmanned vehicle 104 are properties of the unmanned vehicle 104 that vary over time during the operation of the vehicle, independently of the physical structure of the vehicle. The static attributes of an unmanned vehicle 104 are properties of the vehicle that do not vary during the operation of the vehicle. Static attributes are not necessarily absolutely unchanging; however, to change a static attribute a change in the structure of the vehicle is necessary, such as the addition of a tool to the vehicle, or an upgrade to the motor of the vehicle. The nature of dynamic and static attributes will be further clarified by the examples discussed below. The following dynamic attributes are shown in Table 1:

Location: the location of each unmanned vehicle 104 within the facility; as will be seen below, the location of each unmanned vehicle 104 can be updated within database 316 periodically.

Charge: The remaining energy supply of each unmanned vehicle 104, whether the energy supply exists as a battery charge level or a fuel (e.g. gasoline) level. Although shown as a remaining percentage of maximum energy supply, in other examples this attribute may be shown as an actual charge measurement, a fuel volume measurement, an available runtime (before no energy supply remains), and the like.

Availability: Whether the unmanned vehicle 104 is available to perform a task, is already assigned to a task or is inactive, for example due to maintenance. Although shown as a "yes" or "no" indicator, a wide variety of other availability attributes are also contemplated, such as estimated times for which the unmanned vehicle 104 will be busy on a current task, an identifier of the task currently being performed by the unmanned vehicle (that can be used to reference a list of stored task data, for example).

Payload Identifier: An attribute indicating whether each unmanned vehicle 104 currently has a payload. This attribute may be a simple binary value indicating that the unmanned vehicle 104 does, or does not, have a payload. Preferably, however, the payload identifier attribute is an identifier of the payload, such as an identifier of item 116.

The static attributes shown in Table 1 include a maximum payload for each unmanned vehicle 104, representing the maximum weight that the unmanned vehicle 104 can safely bear (as specified by designers of the unmanned vehicle 104, for example). The static attributes of each record also include one or more equipment identifiers, identifying equipment, tools or functions possessed by the respective unmanned vehicles 104. For example, the records corresponding to unmanned vehicles 104-2 and 104-3 include equipment identifiers indicating that unmanned vehicles 104-2 and 104-3 include a payload surface such as payload surface 208. The record corresponding to unmanned vehicle 104-1, on the other hand, indicates that unmanned vehicle 104-1 includes a manipulator arm, but not a payload surface. Equipment identifiers can also include data defining characteristics of the identified equipment, such as the weight capacity of a manipulator arm, or the dimensions of payload surface 208. Further equipment identifiers may identify broader capabilities of each unmanned vehicle 104, such as whether the unmanned vehicle 104 is terrestrial, aquatic, or aerial (or a combination thereof).

A wide variety of other static attributes are also contemplated. Other static attributes that can be included in database 316 and retrieved at block 410 include the following:

Maximum Speed: The maximum speed at which the unmanned vehicle 104 is capable of travelling.

Weight: The weight (without payload) of the unmanned vehicle 104.

A variety of other static and dynamic attributes will now also occur to those skilled in the art. In addition, some attributes identified as static above may be implemented as dynamic attributes in other implementations of system 100. For example, in some embodiments unmanned vehicles 104 may include self-monitoring sensors for indicating when their maximum payloads have decreased due to motor wear. Thus, the maximum payload mentioned above may be considered a dynamic attribute in some implementations.

At block 410, computing device 108 is therefore configured to retrieve some or all of the static and dynamic attributes from database 316. Computing device 108 can also be configured to retrieve other attributes at block 410. In the present example computing device 108 is configured to retrieve location and item attributes from item database 320 and location database 324. In other examples, the retrieval of attributes from one or both of databases 320 and 324 can be omitted, for example when the item and location identifiers in the task request are in a form computing device 108 can use in the remainder of method 400. That is, at block 410 computing device 108 can retrieve item and location attributes necessary for translating the item and location identifiers in the task request into formats suitable for comparison with the attributes of unmanned vehicle 104. An example of database 320 is shown below in Table 2:

TABLE 2

Item Database 320

| Item ID | Weight | Dimensions | Equipment Requirements |
|---|---|---|---|
| 116 | 52 kg | 0.5 m × 0.5 m × 0.5 m | Payload surface |

As seen above, database 320 contains a record for item 116, including a variety of attributes for item 116. Other records may also be included with attributes for other items. The attributes of item 116 are not particularly limited; in general, the item attributes are suitable for comparison with the dynamic and static attributes mentioned above to determine the suitability of each unmanned vehicle 104 for performing the requested action respective to the requested item. As will now be apparent to those skilled in the art, the item identifier received in the request at block 405 (e.g. the identifier "116") may not be suitable for direct comparison with the dynamic and static attributes. In the present example, the item attributes include an identifier of the item, a weight of the item, dimensions of the item, and equipment requirements for performing actions on the item. The weight, dimensions and equipment requirements can be presented in various other formats than those shown above. For example, dimensions may include volumes, areas, dimensions of only certain components of an item, and the like.

In addition to the item attributes, location attributes are retrieved at block 410 from location database 324. An example of location database 324 is shown below in Table 3:

TABLE 3

Location Database 324

| Location ID | Location (X, Y) | Permitted Actions |
|---|---|---|
| Storage 120 | 50, 80 | Pick up, Drop off |
| Work Station 124 | 100, 70 | Machine |
| Conveyor 128 | 140, 65 | Drop off |

As seen in Table 3, database 324 includes a record for each location within the facility. Each record includes a variety of attributes for the location, including a location identifier, location coordinates, and one or more permitted actions for that location. The location coordinates can be presented in any of a variety of formats, including global coordinates (e.g. GPS) or local coordinates (e.g. based on a frame of reference specific to the facility). In general, the location coordinates are provided in database 324 in a form that the processors of unmanned vehicles 104 are configured to use.

The permitted actions in each record of location database 324 identify action types that are allowed at each location. In other embodiments, actions that are not permitted may be stored in database 324 instead. In some embodiments, computing device 108 can be configured to validate the task request received at block 405 before proceeding with vehicle selection. For example, having retrieved the location attributes at block 410, computing device 108 can be configured to compare the action type in the task request with the permitted actions associated with the location identified in the task request. If the requested action is not permitted at the requested location, computing device 108 can refuse the task request. Refusal of a task request can include transmission of an error message (e.g. to controller 132 or for presentation on display 500). In some examples, computing device 108 can also suggest alternative tasks that would be acceptable.

Other validations on task requests can include, for example, determining whether any unmanned vehicles 104 are currently carrying the requested item when the action identifier in the request is "drop off". If no unmanned vehicles 104 have a dynamic payload attribute matching the requested item, then no unmanned vehicle 104 are able to drop the item off, until a "pick up" task is assigned.

Having retrieved the dynamic and static attributes of unmanned vehicles 104, and if necessary the item and location attributes, computing device 108 is then configured to proceed to block 415. At block 415, computing device 108 is configured to select one of the unmanned vehicles 104 to perform the task defined in the task request received at block 405, based on a comparison of the task request with the retrieved dynamic and static attributes.

Figure 6:
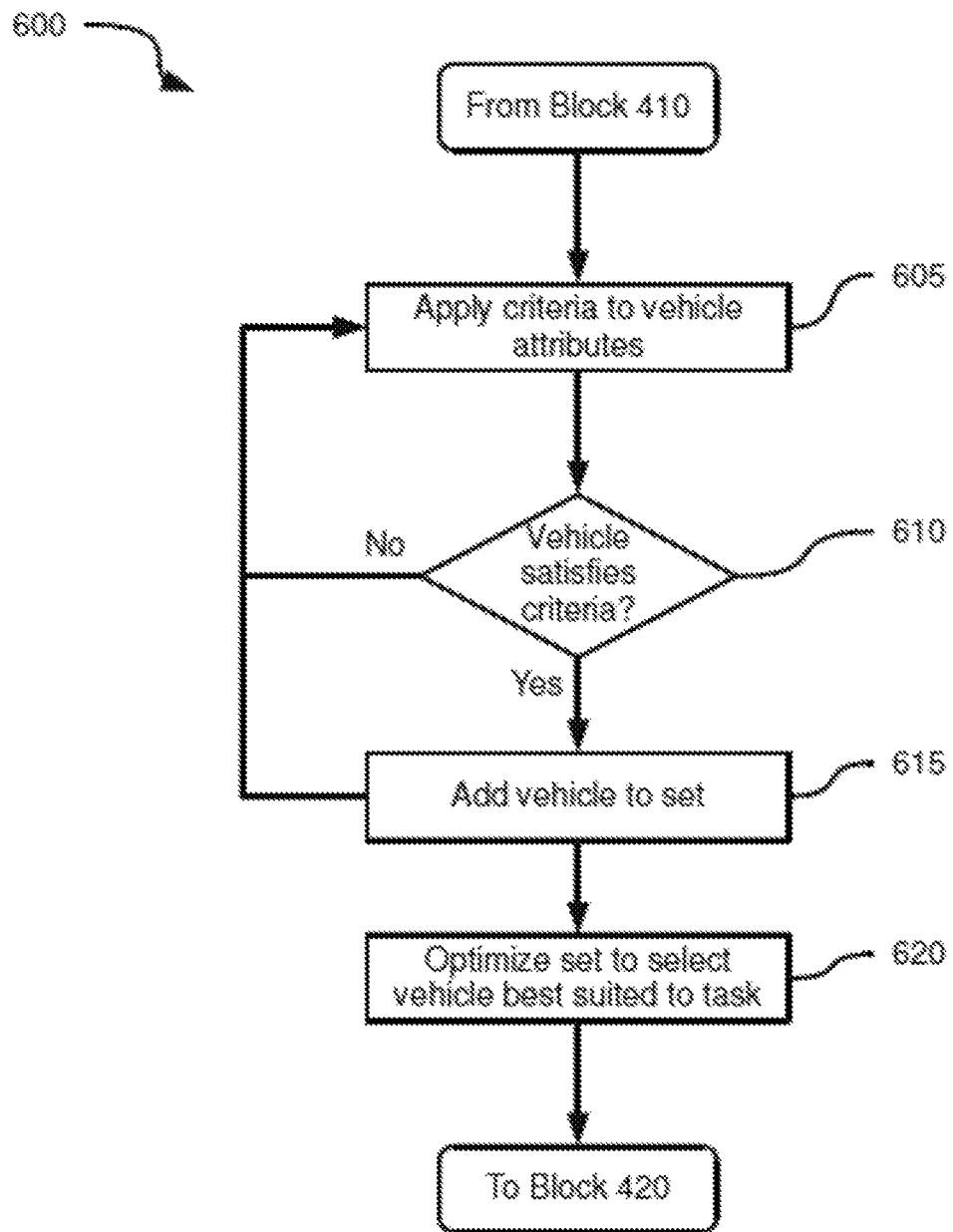
FIG. 6 depicts a method of performing the vehicle selection of block 415 in FIG. 4, according to a non-limiting embodiment.

The selection of an unmanned vehicle at block 415 can be performed in a variety of ways. Referring now to FIG. 6, a method 600 of performing block 415 is depicted. At block 605, computing device is configured to apply at least one criterion to the attributes of each unmanned vehicle 104. The criteria applied at block 605 are selected to eliminate from contention any unmanned vehicles 104 that are not capable of performing the requested task. Examples of the criteria applied at block 605 are provided below.

Vehicle not available: the unmanned vehicle 104 has an availability attribute indicating that the vehicle is not available, or is not available for at least a configurable time period (e.g. five minutes).

Vehicle carrying non-matching payload: the unmanned vehicle 104 is not currently performing a task (that is, the vehicle is available), but the unmanned vehicle has a payload identifier attribute that does not match the item identifier in the task. This indicates that although the unmanned vehicle 104 is available for further tasks, it is only available for further tasks that relate to its current payload.

Alternatively, if the task request specifies a "drop off" action for a certain item, any unmanned vehicle that does not have a matching payload identifier attribute can be eliminated from the set, since a vehicle not currently carrying the requested item is not capable of dropping that item off.

Insufficient Charge: the unmanned vehicle 104 has a charge attribute below a threshold (e.g. ten percent of maximum charge or fuel load).

Insufficient Capacity: the unmanned vehicle 104 has a maximum payload attribute that is below the weight attribute of the item identified in the task request.

Insufficient Equipment: the unmanned vehicle 104 does not have an equipment identifier attribute matching the required equipment attribute of the item identified in the task request.

Other examples of criteria for application at block 605 will now occur to those skilled in the art. At block 610, computing device 108 is configured to determine whether each unmanned vehicle 104 satisfies the criteria applied at block 605. When the determination at block 610 is negative, computing device 108 discards that unmanned vehicle 104 and applies the criteria to the next unmanned vehicle. When the determination at block 610 is affirmative, however, computing device 108 adds the unmanned vehicle evaluated at blocks 605 and 610 to a selection set at block 615.

Taking the current example performance of method 400, in which the task request received at block 405 was a request to pick up item 116 at location 120, applying the above-mentioned criteria leads to a selection set consisting of unmanned vehicles 104-2 and 104-3. Unmanned vehicle 104-1 is eliminated from the selection set because it does not satisfy the capacity or equipment criteria—item 116 has a weight greater than the maximum payload of unmanned vehicle 104-1, and unmanned vehicle 104-1 lacks the payload surface requirement indicated by the attributes of item 116 in database 320.

At block 620, having generated a selection set of unmanned vehicles, computing device 108 is configured to optimize the selection set to identify the unmanned vehicle best suited to the requested task. The optimization of the selection set can be conducted according to a wide variety of conventional optimization algorithms, and can place greater or smaller weightings on some attributes than others, or can weight all attributes equally.

In the present example, unmanned vehicles 104-2 and 104-3 are both capable of performing the requested task, but the maximum payload of unmanned vehicle 104-3 better matches the weight of item 116. Therefore at block 620 in the present example, computing device 108 determines that unmanned vehicle 104-3 is best suited to the requested task.

In other embodiments, block 415 can be varied, for example to omit blocks 605 and 610 and simply optimize on a set comprising all the unmanned vehicles described in database 316.

Returning to FIG. 4, following selection of an unmanned vehicle 104 at block 415, computing device 108 is configured to transmit a command to the selected unmanned vehicle 104 via network 112 and the appropriate one of links 114. The command includes data identifying the item in the task request, data identifying the location in the task request, and data identifying the action in the task request. The data in the command, however, may be in a different form than the data in the task request. For example, instead of the item identifier "116", computing device 108 can transmit the dimensions of item 116 to unmanned vehicle 104-3. In addition, instead of the location identifier "storage 120", computing device 108 can transmit the coordinates of location 120 to unmanned vehicle 104-3. In general, computing device 108 is configured to select, for transmission in the command, the item and location attributes that match the capabilities of the unmanned vehicle 104 being commanded.

Following transmission of the command at block 420, computing device 108 is configured at block 425 to receive a status message from the unmanned vehicle 104 to which the command was sent. The nature of the status message is not particularly limited. Unmanned vehicles 104 are configured to transmit various types of status messages to computing device 108 via network 112. For example, unmanned vehicles may transmit their locations to computing device 108 at configurable intervals, whether or not they are currently performing tasks. As a further example, unmanned vehicles 104 may be configured to transmit a confirmation message when the command sent at block 425 is received. In other words, in the present example performance of method 400, the status message received at block 425 can be a message from unmanned vehicle 104-3 accepting the task defined in the command sent at block 420.

In response to receiving the message at block 425, computing device 108 is configured at block 430 to determine whether the message indicates that the task assigned to the unmanned vehicle 104 is complete. The determination at block 430 can include inspecting the status message for a value indicating that the task is complete. In the present example performance of method 400, the determination at block 430 is negative, because the status message received at block 425 was merely a confirmation of the command sent at block 420. Thus, performance of method 400 proceeds to block 435.

At block 435, computing device 108 is configured to determine whether the message received at block 425 constitutes an error message indicating that the task assignment has failed. Task failure may occur for a variety of reasons. For example, an unmanned vehicle 104 may arrive at the location specified and discover that no item matching the data in the command is present. In other examples, an unmanned vehicle may become disabled during the performance of a task.

When the determination at block 435 is affirmative, computing device 108 is configured at block 440 to send a notification of the error message to the requester (that is, the originator of the task received at block 405). Computing device 108 can also be configured to generate one or more error handling tasks. For example, computing device 108 can dispatch a different unmanned vehicle 104 to complete the failed task; computing device 108 can also assign a new task to the unmanned vehicle 104 that delivered the error message, instructing that unmanned vehicle 104 to proceed immediately to a maintenance area of the facility, where human operators can safely access the unmanned vehicle 104. In addition to, or instead of, the generation of an error handling task, computing device 108 can prompt an operator (for example, via display 500) to provide further instructions.

In the present example performance of method 400, the message received at block 425 was a confirmation of receipt from unmanned vehicle 104-3, and the determination at block 435 is therefore negative. Computing device 108 is therefore configured to proceed to block 445, at which a status update may be sent to the requester. Computing device 108 can also update one or more attributes associated with the unmanned vehicle from which the status message was received. For example, as in the present performance of method 400 where the message is a confirmation of receipt of a command sent at block 420, computing device 108 may, at block 445, update the availability attribute of unmanned vehicle 104-3 to replace the "yes" shown in Table 1 with the value "no" or any other value indicating that unmanned vehicle 104-3 is currently performing a task. For example, the "yes" may be replaced with an identifier of the task, referring to another database in which the estimated time of completion for the task is stored.

Figure 7:
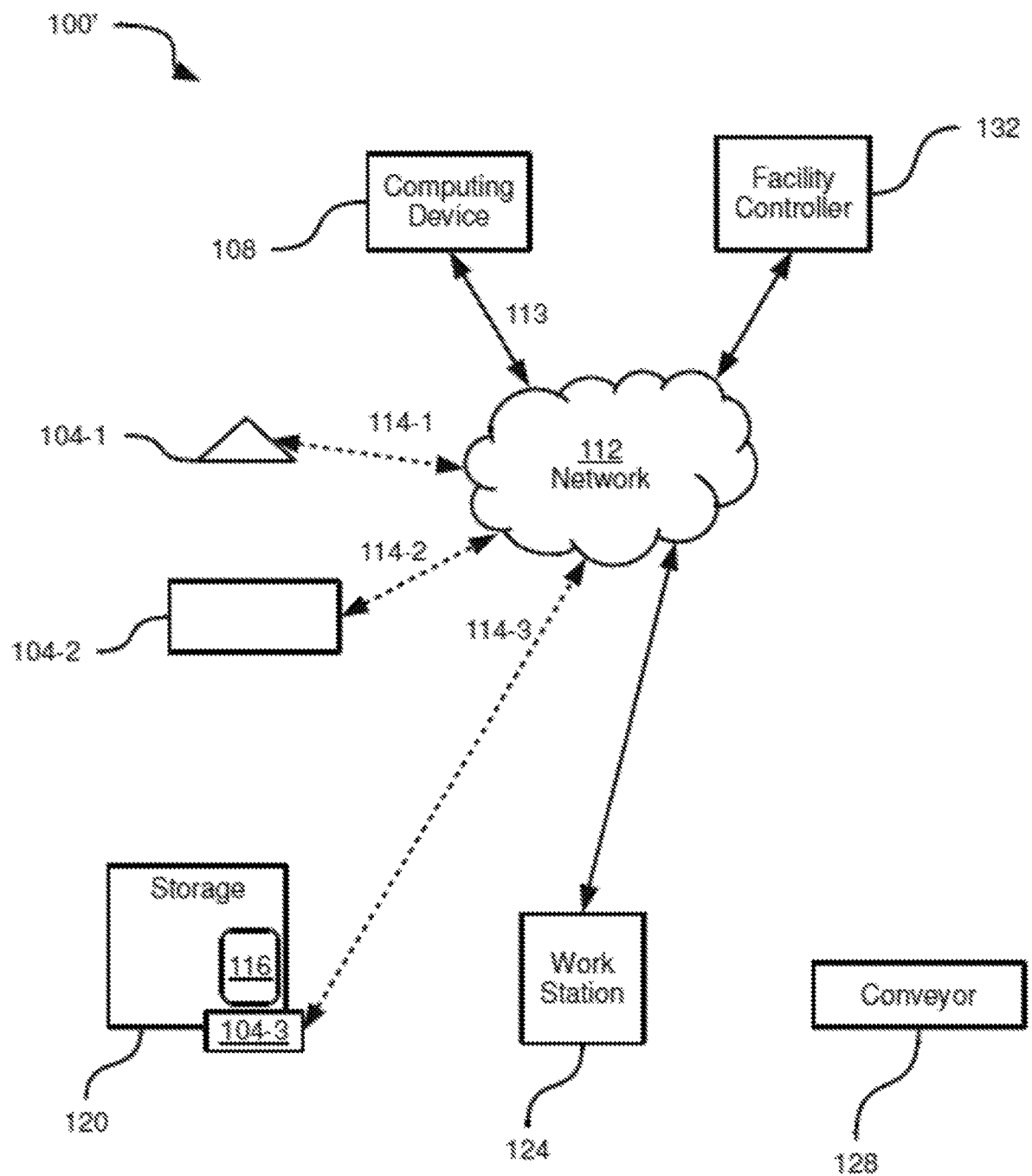
FIGS. 7-9 depict variations of the system of FIG. 1 following repeated performances of the method of FIG. 4, according to a non-limiting embodiment.

Following the performance of block 445, computing device 108 can be configured to return to block 425 and await a further status message. Further status messages may report the location of unmanned vehicle 104-3 as it travels towards location 120, and thus computing device 108 may repeat blocks 425, 430, 435 and 445 as needed. Referring now to FIG. 7, an updated version of system 100, identified as system 100', is illustrated in which unmanned vehicle 104-3 has arrived at location 120 and picked up item 116. In other words, the task assigned to unmanned vehicle 104-3 at block 420 is complete. Thus, unmanned vehicle 104-3 transmits a further status message to computing device 108, indicating the completion of the task.

Following a further performance of block 425 to receive the completion status message, computing device 108 determines that the task is complete at block 430, and proceeds to block 450. At block 450, the attributes of unmanned vehicle 104-3 can be updated. For example, Table 1 may be updated as shown in Table 4, below.

TABLE 4

Updated Vehicle Capabilities Database 316

| Vehicle ID | Location (X, Y) | Charge | Available ? | Max Payload | Payload ID | Equipment ID |
|---|---|---|---|---|---|---|
| 104-1 | 130, 50 | 80% | Yes | 20 kg | | Manipulator Arm |
| 104-2 | 100, 0 | 70% | Yes | 400 kg | | Payload Surface |
| 104-3 | 50, 80 | 35% | Yes | 60 kg | Item 116 | Payload Surface |

As seen in Table 4, unmanned vehicle 104-3 is shown as available, because the task assigned to unmanned vehicle 104-3 is complete and unmanned vehicle 104-3 is thus available to perform further tasks. However, Table 4 also indicates that unmanned vehicle 104-3 now has a payload in the form of item 116. Other attributes may also be updated, such as the location of unmanned vehicle 104-3 (which now matches the location of location 120), and the charge of unmanned vehicle 104-3.

Following the performance of block 450, computing device 108 can receive further task requests and repeat the performance of method 400. It is contemplated that computing device 108 can perform multiple instances of method 400 simultaneously, one instance being performed for each task request received. Thus, assignments of tasks to vehicles at block 420 can include optimizing the set of unmanned vehicles 104 not only to the set of attributes defined by a single task request, but to the set of attributes defined by all pending task requests received at various instances of block 405. To that end, task requests can also include priority indicators identifying the relative importance of the task, or the expected completion time of the task. Such priority indicators are not mandatory, and can be omitted from some task requests, or entirely in some embodiments. It will now be apparent that in some cases, an unmanned vehicle 104 can be assigned a second task before completing its current task, for example when the time required to complete both tasks does not exceed any constraints expressed in the task requests (such as priority indicators).

Figure 8:
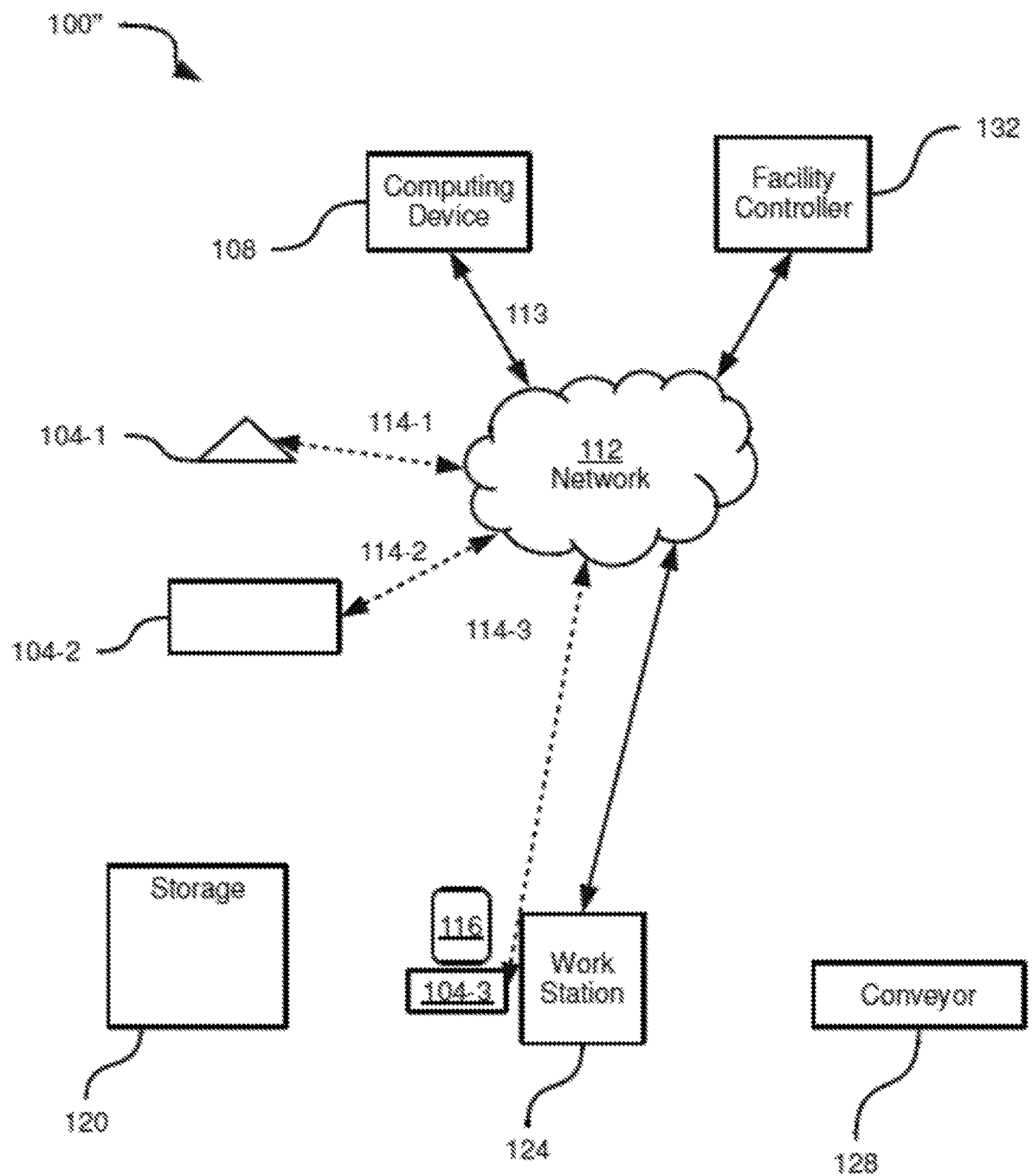

In subsequent performances of method 400, further tasks can be received at block 405 requesting further actions to be performed respective to item 116. For example, a further task request to identify item 116, location 124, and the action type "machine" may be received at computing device 108. During the vehicle selection at block 415, computing device 108 selects unmanned vehicle 104-3, as unmanned vehicle 104-3 has a dynamic attribute indicating that its current payload includes item 116. In other words, item 116 itself has become a reference to unmanned vehicle 104-3, in that task requests identifying item 116 are routed to unmanned vehicle 104-3 as long as unmanned vehicle 104-3 bears item 116. Thus, as shown in FIG. 8, system 100' updates to system 100'', in which unmanned vehicle 104-3 carries item 116 to location 124 and waits for a further task.

Figure 9:
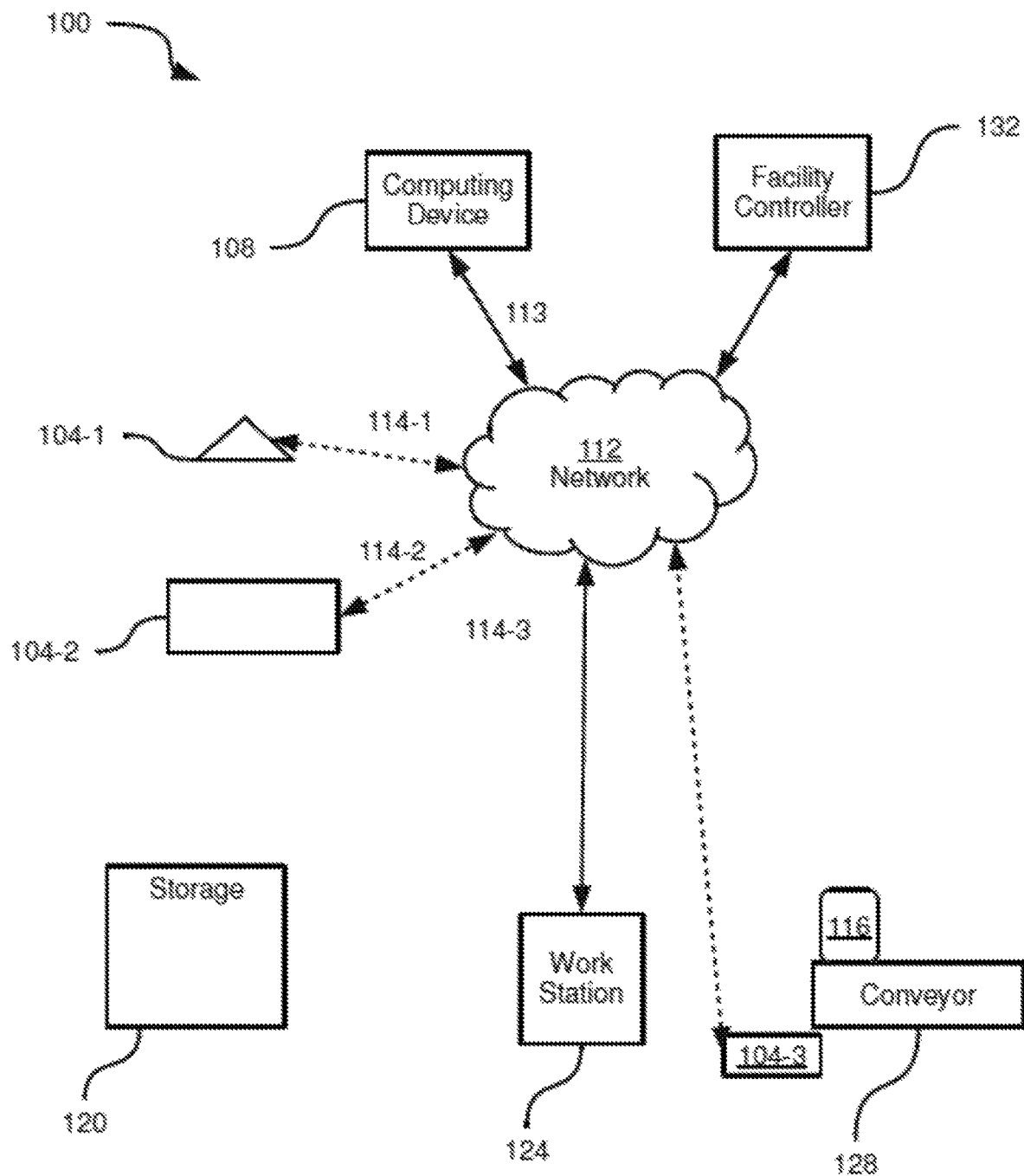

As a further example, computing device 108 can receive another task request, to drop off item 116 at location 128. Again, since unmanned vehicle 104-3 still bears item 116 and therefore still has the dynamic payload attribute "item 116", computing device 108 selects unmanned vehicle 104-3 to perform the task. Following performance of the "drop off" task, system 100'' appears as system 100''' shown in FIG. 9, in which unmanned vehicle 104-3 has dropped off item 116 at location 128. A further performance of block 450 leads to the removal of the identifier for item 116 from the dynamic payload attribute corresponding to unmanned vehicle 104-3 in database 316, thus disassociating item 116 from unmanned vehicle 104-3.

The above-mentioned task requests can be issued, for example by controller 132, in response to completion status messages from computing device 108. For example, in response to the completion of the task illustrated in FIG. 7, controller 132 can be configured to issue the next task request, and in response to the completion of the task illustrated in FIG. 8, controller 132 can be configured to issue the following task request.

In addition to tasks for which requests are received at computing device 108, computing device 108 can generate tasks. Some such self-generated tasks (for example, tasks generated at block 440 of method 400 to instruct an unmanned vehicle 104 to perform a task unsuccessfully attempted by another unmanned vehicle 104) are processed by performing method 400 as described above. Other self-generated tasks can take a different form from the item, location and action-focused tasks mentioned above.

Figure 10:
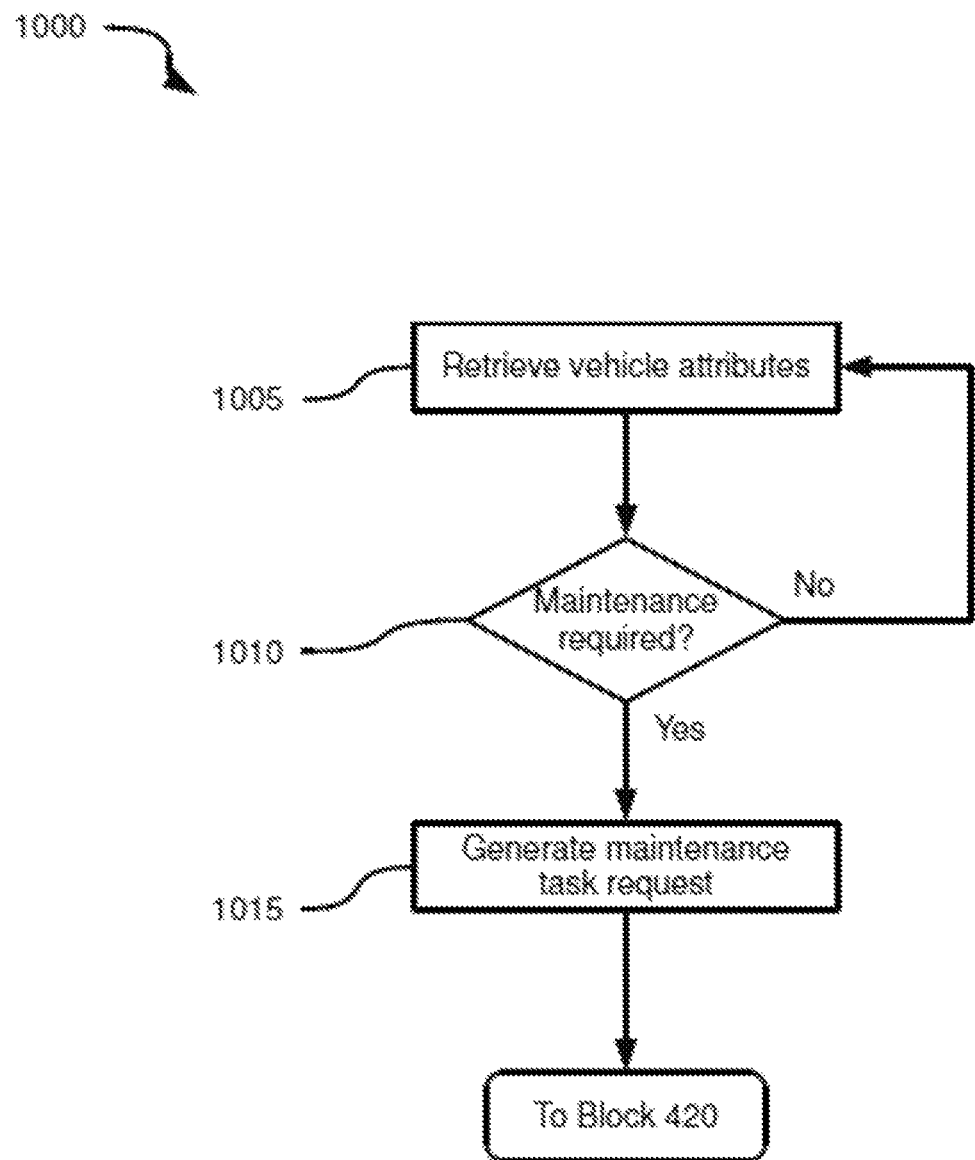
FIG. 10 depicts a method of generating maintenance tasks in the system of FIG. 1, according to a non-limiting embodiment.

Turning to FIG. 10, a method 1000 of generating maintenance tasks at computing device 108 is illustrated. Method 1000 can be performed by computing device 108 alongside method 400. Briefly, via the performance of method 1000, computing device 108 is configured to automatically instruct unmanned vehicles 104 to perform various maintenance-related tasks.

At block 1005, computing device 108 is configured to retrieve vehicle attributes substantially as described in connection with block 410. At block 1005, however, the retrieval of static attributes may be omitted. Computing device 108 can be configured to perform block 1005 on a predetermined cycle (for example, every hour).

At block 1010, computing device 108 is configured to determine from the retrieved vehicle attributes whether any of the unmanned vehicles 104 require maintenance. The determination at block 1010 can be performed by comparing the vehicle attributes to maintenance requirements stored in memory 304. For example, the determination at block 1010 may by affirmative if the charge of an unmanned vehicle 104 is below a threshold of ten percent. In another example, a dynamic vehicle attribute can indicate the time and date of the last maintenance check performed on the unmanned vehicle 104, and the determination at block 1010 may be affirmative if the last maintenance check is older than a configurable period of time (e.g. one week).

When the determination at block 1010 is negative, performance of method 1000 returns to block 1005, to await the next scheduled retrieval of vehicle attributes. When the determination at block 1010 is affirmative, however, computing device 108 generates a maintenance task at block 1015. The maintenance task differs from the task requests discussed earlier in that the maintenance task does not identify an item, and does identify a specific unmanned vehicle 104.

Once the maintenance task has been generated, computing device 108 performs an instance of method 400, beginning at block 420. Maintenance tasks may act as overrides to task requests received at block 405, for example by carrying an elevated priority flag. In other words, if two tasks require assignment to unmanned vehicles 104, and one of the tasks is a maintenance task, computing device 108 can be configured to assign the maintenance task to the identified unmanned vehicle 104, even if that unmanned vehicle 104 was also suitable for the "regular" task.

Figure 11:
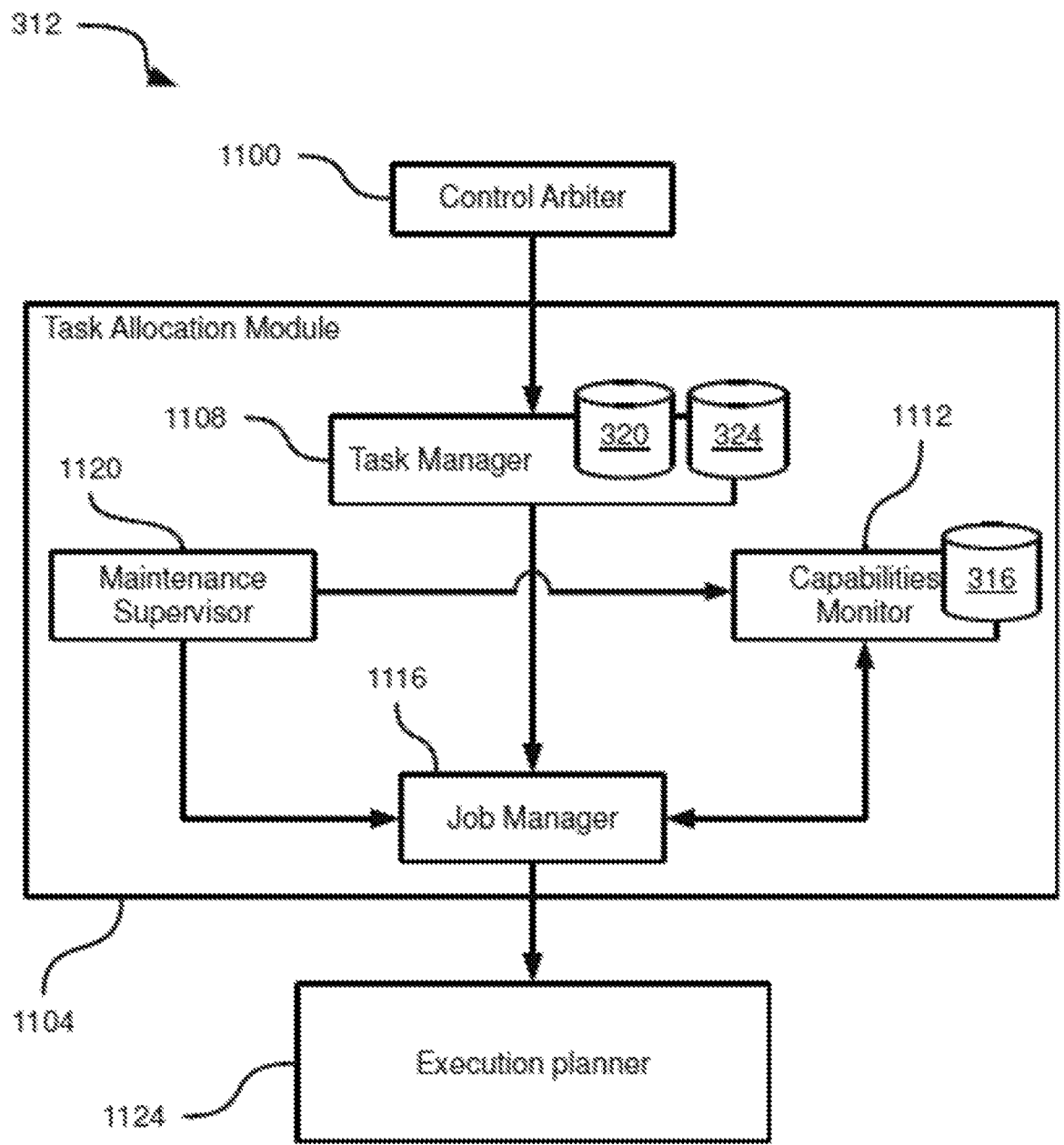
FIG. 11 depicts an example architecture of the application of FIG. 1, according to a non-limiting embodiment.

Turning now to FIG. 11, an example architecture for application 312 is depicted. The architecture shown in FIG. 11 is provided solely for illustrative purposes—application 312 may be also implemented in a wide variety of other ways. In the present example, application 312 includes a control arbiter module 1100 that performs block 405 (receipt of task requests) and can also perform block 425 and the notifications at blocks 440 and 450.

Task requests received by control arbiter 1100 are passed to a task allocation module 1104 that includes a task manager component 1108 that manages database 320 and 324. Task manager 1108 can perform the retrieval of item and location attributes at block 410, as well as any validation of incoming task requests.

Task allocation module 1104 also includes a capabilities monitor component 1112 that manages database 316. Capabilities monitor 1112 thus provides vehicle attributes to other components of application 312 and updates database 316 in response to messages received from other components. Among such other components is a job manager component 1116 that performs the retrieval of vehicle attributes at block 410, and also receives item and location attributes from task manager 1108. Job manager 1116 performs blocks 415 (and, by extension, method 600) and 420, as well as blocks 430, 435 and the attribute updates to capabilities monitor 1112 at blocks 440 and 450. Job manager 1116 can also receive status messages via control arbiter 1100 at block 425, and can instruct control arbiter 1100 to transmit the notifications sent at blocks 440 and 450. Task allocation module 1104 also includes a maintenance supervisor 1120 for performing method 1000.

Commands sent at block 420 are provided by job manager 1116 to an execution planner module 1124, which is responsible for direct communication with unmanned vehicles 104, including path planning and the like.

Variations to the embodiments described above are contemplated. For example, in addition to detecting errors at block 435 in response to messages received from unmanned vehicles 104, computing device 108 can detect errors in the absence of messages from unmanned vehicles 104, for example by inspecting vehicle attributes such as charge and generating an error when a vehicle's charge falls below a threshold. Further, computing device 108 can generate an error at block 435 when no messages have been received from an unmanned vehicle 104 for a predetermined length of time.

In another variation, the validation mentioned above at block 410 can include comparing item attributes to location attributes. For example, computing device 108 can compare known dimensions of an item with dimensions of a location, and generate an error when the item dimensions exceed the location dimensions. In generating the interface shown in FIG. 5, computing device 108 can also be configured to control display 500 to ghost or grey out action elements 512 that are not compatible with the currently selected item or location.

In a further variation, multiple tasks can be received simultaneously at block 405. For example, the interface shown in FIG. 5 can include multiple copies of fields 504 and 508 and elements 512, to allow the definition of several task requests for simultaneous submission to computing device. In further examples, a task request can include more than one location identifier and more than one action type identifier (for example, the tasks shown in FIGS. 7 and 8 can be combined into a single task).

Figure 12:
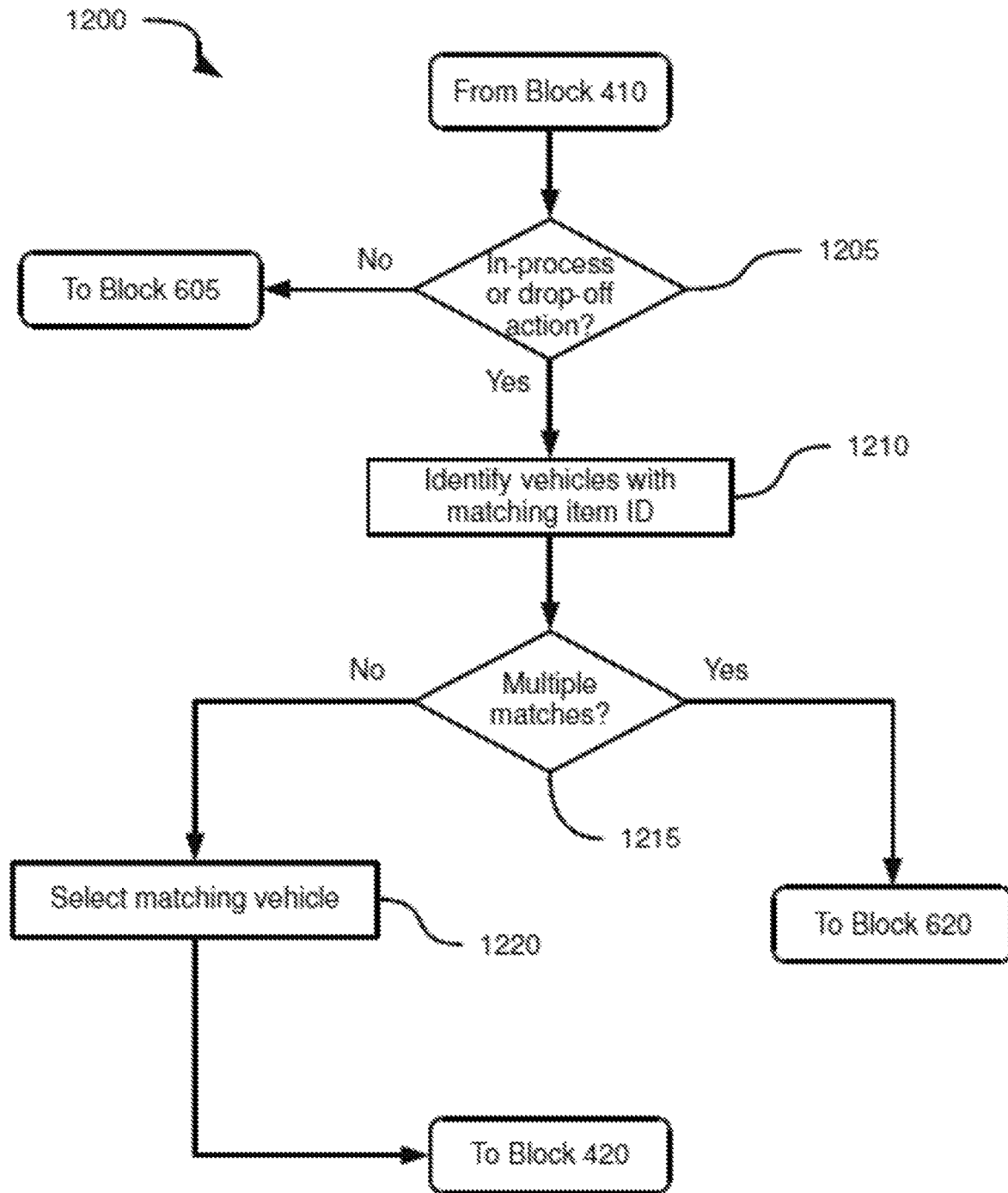
FIG. 12 depicts a method of performing the vehicle selection of block 415 in FIG. 4, according to another non-limiting embodiment.

In still other variations, the selection of an unmanned vehicle 104 at block 415 can be simplified in some circumstances. FIG. 12 depicts a method 1200 of performing block 415. Method 1200 can be implemented by computing device 108 in conjunction with method 600. Beginning at block 1205, computing device 108 is configured to determine whether the action identified in the task request received at block 405 is a drop-off action or an in-process action (such as the machine and cleaning actions shown in FIG. 5). More generally, computing device 108 determines at block 1205 whether the requested action requires an unmanned vehicle 104 already carrying the requested item.

When the determination at block 1205 is negative, computing device 108 can perform method 600 as described earlier, beginning at block 605. When the determination at block 1205 is affirmative, however, computing device 108 proceeds to block 1210. At block 1210, computing device 108, rather than build a selection set of unmanned vehicles 104 and optimize the set, simply identifies any unmanned vehicles 104 having a dynamic payload attribute matching the requested item identifier.

At block 1215, computing device 108 determines whether multiple unmanned vehicles have a payload attribute matching the requested item (that is, whether multiple unmanned vehicles 104 are currently carrying the requested item). When only one unmanned vehicle 104 has a matching payload attribute in database 316, computing device 108 proceeds to block 1220 and selects that unmanned vehicle 104. When multiple matching unmanned vehicles 104 are identified at block 1215, computing device 108 instead proceeds to block 620 to select an optimal vehicle among those carrying the requested payload. In this case, the optimization at block 620 can also be based on payload attribute age: payload attributes in database 316 can bear timestamps, and the performance of block 620 can therefore include payload age as a variable in the optimization process (along with location, charge, and the like, as described earlier). In other embodiments, instead of performing an optimization as in block 620, computing device 108 can simply select the unmanned vehicle with the oldest payload attribute (that is, the vehicle that has been carrying the required item for the longest period of time).

In yet another variation, system 100 can accommodate physical changes to items as a result of the performance of tasks by unmanned vehicles 104. For example, work station 124 can be a machining station at which item 116 is transformed into another item. In general, computing device 108 is configured, at block 450 (once the task is complete) to replace the dynamic payload attribute identifying item 116 in association with unmanned vehicle 104-3 with a different dynamic payload attribute identifying the item into which item 116 was transformed. The update performed at block 450 can be carried out in a variety of ways.

For example, the task request received at block 405 can include an initial item identifier and a final item identifier. The initial item identifier can identify item 116, while the final item identifier can identify the item into which item 116 will be transformed at work station 124. In other examples, the task request received at block 405 can identify only item 116, and computing device 108 can store, in memory 304, tasks in response to which item 116 is known to transform. For example, computing device 108 can store a record stating that in response to a task requiring item 116 to be machined at location 124, item 116 becomes a different item. Thus, at block 450 computing device 108 can consult such records and replace the dynamic payload attribute of unmanned vehicle 104-3 accordingly.

The above functionality can be extended to sets of multiple items. For example, at block 405 a set of task requests can be received, having a location and an action type in common but relating to different items. A single final item identifier can be included with the set of task requests, indicating that a plurality of items are to be brought to the same location (e.g. work station 124), where they will be combined into the single final item.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A system comprising: at least three robots comprising a first robot with a first battery-charge level, a second robot with a second battery-charge level, and a third robot with a third battery-charge level; a computing device in communication with the at least three robots via a network, the computing device storing, in a memory, a battery-charge attribute respective to each of the at least three robots, the battery-charge attributes comprising a first battery-charge attribute associated with the first battery-charge level, a second battery-charge attribute associated with the second battery-charge level, and a third battery-charge attribute associated with the third battery-charge level; the computing device configured to: receive a task request; responsive to receiving the task request, retrieve the battery-charge attributes from the memory; evaluate the first battery-charge attribute and the second battery-charge attribute against a criterion, determine that the first battery-charge attribute and the second battery-charge attribute satisfy the criterion, and add the first robot and the second robot to a selection set; evaluate the third battery-charge attribute against the criterion, determine that the third battery-charge attribute does not satisfy the criterion, and omit the third robot from the selection set; determine an optimization of the selection set based on the first battery-charge attribute and the second battery-charge attribute; select one and only one of the first robot and the second robot from the selection set based on the optimization; and transmit, via the network, a command to the selected robot to perform an action associated with the task request.

2. The system of claim 1, wherein the first robot is selected and the optimization is based on the first battery-charge attribute being greater than the second battery-charge attribute.

3. The system of claim 1, wherein the second robot is selected and the optimization is based on the second battery-charge attribute being less than the first battery-charge attribute.

4. The system of claim 1, wherein: the computing device configured to receive the task request comprises the computing device configured to receive a first task request and a second task request; and the computing device configured to select one and only one of the first robot and the second robot from the selection set is based on the optimization of the first battery-charge attribute and the second battery-charge attribute and the first task request and the second task request.

5. The system of claim 4, wherein: the first task request comprises a first action type and the second task request comprises a second action type; the computing device configured to select one and only one of the first robot and the second robot from the selection set is based on the optimization of the first battery-charge attribute and the second battery-charge attribute and the first action type and the second action type.

6. The system of claim 5, wherein: the first robot is selected and the optimization is based on the first battery-charge attribute being greater than the second battery-charge attribute, and the first action type and the second action type; the computing device configured to transmit, via the network, the command to the selected robot to perform the action associated with the task request comprises the computing device configured to transmit a first command to the first robot to perform a first action associated with the first action type; and the computing device is further configured to transmit, via the network, a second command to the second robot to perform a second action associated with the second action type.

7. The system of claim 5, wherein: the second robot is selected and the optimization is based on the second battery-charge attribute being less than the first battery-charge attribute, and the first action type and the second action type; the computing device configured to transmit, via the network, the command to the selected robot to perform the action associated with the task request comprises the computing device configured to transmit a first command to the second robot to perform a first action associated with the first action type; and the computing device is further configured to transmit, via the network, a second command to the first robot to perform a second action associated with the second action type.

8. The system of claim 1, wherein the computing device is further configured to transmit, via the network, a command to the third robot associated with a maintenance task.

9. A method comprising: receiving a task request with a computing device; retrieving, from a memory, a first battery-charge attribute associated with a first robot, a second battery-charge attribute associated with a second robot, and a third battery-charge attribute associated with a third robot; determining, with the computing device, that the first battery-charge attribute is greater than the second battery-charge attribute, and that the second battery-charge attribute is greater than the third battery-charge attribute; evaluating, using the computing device, the first battery-charge attribute, the second battery-charge attribute, and the third battery-charge attribute against a criterion; determining, using the computing device, that the first battery-charge attribute and the second battery-charge attribute satisfy the criterion, and adding the first robot and the second robot to a selection set; determining, using the computing device, that the third battery-charge attribute does not satisfy the criterion, and omitting the third robot from the selection set; optimizing the selection set, using the computing device, based on the first battery-charge attribute, and the second battery-charge attribute; selecting, using the computing device, based on the optimizing; and transmitting, using the computing device, via a network, a command to the selected robot to perform an action associated with the task request.

10. The method of claim 9, wherein the first robot is selected and the optimization is based on the first battery-charge attribute being greater than the second battery-charge attribute.

11. The method of claim 9, wherein the second robot is selected and the optimization is based on the second battery-charge attribute being less than the first battery-charge attribute.

12. The method of claim 9, wherein the task request is a first task request, the method further comprising: receiving a second task request; and wherein the optimizing the selection set is based on the first battery-charge attribute and the second battery-charge attribute and the first task request and the second task request.

13. The method of claim 12, wherein: the first task request comprises a first action type and the second task request comprises a second action type, the method further comprising the optimizing the selection set is based on the first battery-charge attribute and the second battery-charge attribute and the first action type and the second action type.

14. The method of claim 13: wherein the selecting comprises selecting the first robot; wherein the optimizing is based on the first battery-charge attribute being greater than the second battery-charge attribute, and the first action type and the second action type; and wherein transmitting the command to the selected robot comprises transmitting a first command to the first robot to perform a first action associated with the first action type; the method further comprising transmitting, via the network, a second command to the second robot to perform a second action associated with the second action type.

15. The method of claim 13: wherein the selecting comprises selecting the second robot; wherein the optimizing is based on the second battery-charge attribute being less than the first battery-charge attribute, and the first action type and the second action type; and wherein transmitting the command to the selected robot comprises transmitting a first command to the second robot to perform a first action associated with the first action type; the method further comprising transmitting, via the network, a second command to the first robot to perform a second action associated with the second action type.

16. The method of claim 9, further comprising transmitting, via the network, a command to the third robot associated with a maintenance task.

17. The method of claim 9, wherein the task request is received from a facilities controller via the network.

* * * * *